US006222702B1

(12) United States Patent
Macken et al.

(10) Patent No.: US 6,222,702 B1
(45) Date of Patent: Apr. 24, 2001

(54) MAGNETIC READ ELEMENT SHIELD HAVING DIMENSIONS THAT MINIMIZE DOMAIN WALL MOVEMENT

(75) Inventors: Declan Macken; Alan Biggar Johnston, both of Derry (IE); Gregory Stephen Mowry, Burnsville; Charles Henry Tolman, Bloomington, both of MN (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/134,780

(22) Filed: Aug. 13, 1998

Related U.S. Application Data

(60) Provisional application No. 60/055,938, filed on Aug. 15, 1997.

(51) Int. Cl.[7] .................................. G11B 5/11; G11B 5/39
(52) U.S. Cl. ............................................. 360/128; 360/322
(58) Field of Search .............................................. 360/128

(56) References Cited

U.S. PATENT DOCUMENTS

| 4,750,072 | 6/1988 | Takago ................................. 360/126 |
| 4,803,580 | 2/1989 | Mowry ................................. 360/113 |
| 4,807,074 | 2/1989 | Kamo ................................... 360/113 |
| 4,814,921 | 3/1989 | Hamakawa et al. ................. 360/126 |
| 4,821,133 | 4/1989 | Mowry et al. ....................... 360/113 |
| 4,843,506 | 6/1989 | Gill et al. ............................. 360/113 |
| 4,900,650 | 2/1990 | Das ....................................... 360/126 |
| 4,912,584 | 3/1990 | Mallary et al. ...................... 360/126 |
| 4,967,298 | 10/1990 | Mowry ................................ 360/113 |
| 5,032,945 | 7/1991 | Argyle et al. ....................... 360/126 |
| 5,085,935 | 2/1992 | Mallary ............................... 360/113 |
| 5,207,841 | 5/1993 | Shigeta et al. ...................... 148/307 |
| 5,208,715 | 5/1993 | Mowry ................................ 360/113 |
| 5,287,238 | 2/1994 | Baumgart et al. .................. 360/113 |
| 5,408,377 | 4/1995 | Gurney et al. ...................... 360/113 |
| 5,422,571 | 6/1995 | Gurney et al. ...................... 324/252 |
| 5,432,734 | 7/1995 | Kawano et al. ..................... 365/158 |
| 5,465,185 | 11/1995 | Heim et al. ......................... 360/113 |
| 5,515,221 | 5/1996 | Gill et al. ............................. 360/113 |
| 5,621,592 | 4/1997 | Gill et al. ............................. 360/113 |
| 5,739,991 | * 4/1998 | Matono et al. ..................... 360/113 |
| 6,038,093 | * 3/2000 | Takada et al. ........................ 360/66 |

* cited by examiner

*Primary Examiner*—George J. Letscher
(74) *Attorney, Agent, or Firm*—Kinney & Lange, P.A.

(57) ABSTRACT

A shield for a read element of a magnetic recording head is disclosed. The shield includes a first and a second triangular shaped closure magnetic domains positioned approximate a top surface of the shield such that a first surface of each of the first and second magnetic domains are formed by a portion of a first side of the shield and a second side of the shield, respectively. The shield also includes a third and a fourth triangular shaped closure magnetic domains positioned approximate the bottom surface of the shield. A first surface of the third and fourth magnetic domains are formed by a portion of the first side and the second side of the shield, respectively. A first magnetic domain wall is positioned between the first and second triangular shaped closure magnetic domains, while a second magnetic domain wall is positioned between the third and fourth triangular shaped closure magnetic domains.

7 Claims, 4 Drawing Sheets

MAGNETIC READ ELEMENT SHIELD HAVING DIMENSIONS THAT MINIMIZE DOMAIN WALL MOVEMENT

CROSS-REFERENCE TO RELATED APPLICATION(S)

This application is based upon and claims priority from U.S. Provisional Application Ser. No. 60/055,938 filed Aug. 15, 1997.

BACKGROUND OF THE INVENTION

The present invention relates generally to the field of electronic data storage and retrieval. In particular, the present invention relates to a shield design of a magnetoresistive reader that eliminates magnetic interactions between a magnetic read head shield and a magnetic read element by preventing displacement of domain walls within the shield.

A magnetic read head retrieves magnetically-encoded information that is stored on a magnetic medium or disc. The magnetic read head is typically formed of several layers that include a top shield, a bottom shield, and a read element or sensor positioned between the top and bottom shield. The read element is fabricated from a magnetoresistive composition, typically a ferromagnetic material such as Nickel-Iron (NiFe). The read element is magnetized along an easy axis of low coercivity. The read element is mounted on the read head such that the easy axis is transverse to the direction of disc rotation and parallel to the plane of the disc. Magnetic flux from the disc surface causes rotation of the magnetization vector of the read element, which in turn causes a change in electrical resistivity of the read element. The change in resistivity of the read element can be detected by passing a sense current through the read element and measuring a voltage across the read element. External circuitry then converts the voltage information into an appropriate format and manipulates that information as necessary.

During a read operation, the top and bottom shields ensure that the read element reads only the information stored directly beneath it on a specific track of the magnetic medium or disc by absorbing any stray magnetic fields emanating from adjacent tracks and transitions. Within the bottom shield exists a plurality of magnetic domains. The magnetic domains are separate by one of a plurality of a magnetic domain walls. Each domain has a magnetization that is oriented in a direction different than the magnetization of all adjacent domains. The application of an external magnetic field, either during manufacture or from an adjacent track or transition of the magnetic storage medium during operation, to a shield can cause the magnetization of each of the domains within that shield to rotate, thereby causing the domains to move, grow, or shrink. Thus, the domain walls are relocated due to the external magnetic field. The movement of a domain wall through a portion of the shield that is directly adjacent the read element results in Barkhausen noise, which is a local perturbation of the magnetic structure within the read element producing an unwanted change in the resistance of the read element. Until recently, Barkhausen noise induced by domain wall movement has been negligible. However, as storage densities on magnetic media and discs have increased, the read element has necessarily become smaller, more sensitive, and more susceptible to Barkhausen noise created by domain wall movement. Therefore, there is a need for a shield design that elites Barkhausen noise by minimizing domain wall movement within the particular shield.

BRIEF SUMMARY OF THE INVENTION

The present invention is a shield design that eliminates Barkhausen noise by preventing domain wall movement within a particular shield. The shield design includes first and second triangular shaped closure magnetic domains positioned approximate a top surface of the shield such that a first surface of each of the first and second magnetic domains are formed by a portion of a first side of the shield and a second side of the shield, respectively. The shield also includes third and fourth triangular shaped closure magnetic domains positioned approximate the bottom surface of the shield. A first surface of a third and fourth magnetic domains are formed by a portion of the first side and the second side of the shield, respectively. A first magnetic domain wall is positioned between the first and second triangular shaped closure magnetic domains, while a second magnetic domain wall is positioned between the third and fourth triangular shaped closure magnetic domains.

In one preferred embodiment, the first magnetic domain wall intersects both an intersection point of the first triangular shaped closure magnetic domain and an intersection point of the second triangular shaped closure magnetic domain. Likewise, a second magnetic domain wall intersects both an intersection point of the third triangular shaped closure magnetic domain and an intersection point of the fourth triangular shaped closure magnetic domain. Both the first and the second magnetic domain walls are positioned parallel to an air bearing surface of the shield. The first, second, third, and fourth triangular shaped closure magnetic domains each equal an equilibrium domain, the equilibrium domain being an average width of a magnetic domain in a demagnetized sample shield that has a total magnetic moment equal to zero.

DETAILED DESCRIPTION

The present invention provides a magnetoresistive sensor having improved stability. It is recognized that a source of Barkhausen noise stems from magnetic domain walls within either shield of a shield system (top and bottom shields) adjacent a read element.

Figure 1:
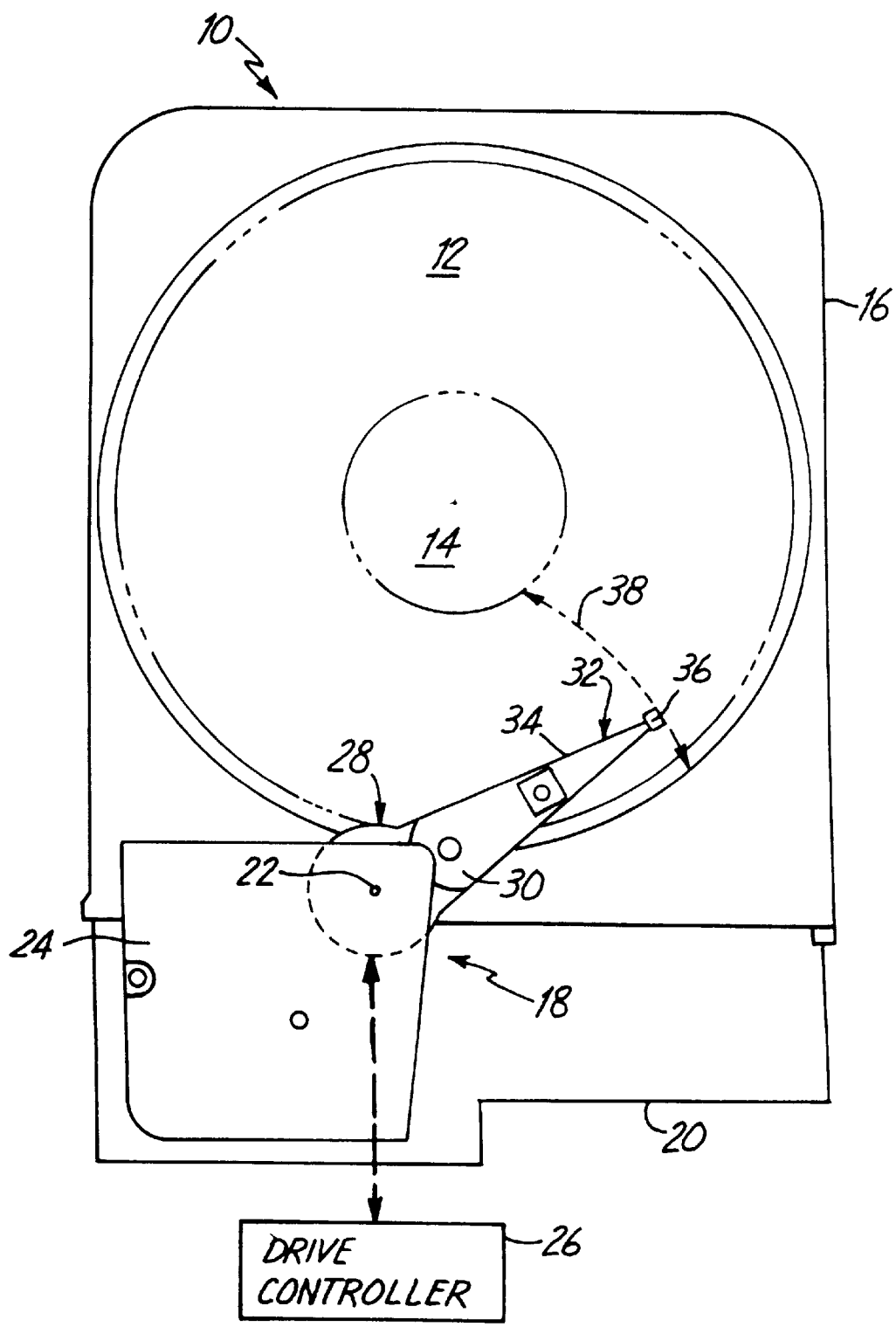
FIG. 1 is a simplified diagram of a disc drive storage system.

FIG. 1 is a top view of disc drive system 10 including a magnetoresistive sensor in accordance with the present invention. Disc drive system 10 includes magnetic disc 12 mounted for rotational movement about an axis defined by spindle 14 within housing 16. Disc drive 10 also includes actuator 18 mounted to base plate 20 of housing 16 and pivotally moveable relative to disc 14 about axis 22. Cover 24 covers a portion of actuator 18. Drive controller 26 is coupled to actuator 18. Drive controller 26 is either mountable within disc drive system 10 or is located outside of disc drive system 10 with suitable connection to actuator 18.

Actuator 18 includes actuator arm assembly 28, a rigid support member 30, and head gimble assembly 32. Head gimble assembly 32 includes flexure arm 34 couple to rigid member 30 and air bearing slider 36 couple to flexure arm 34 by a gimble. Slider 36 supports a magnetoresistive transducer or head for reading information from disc 12 and encoding information to disc 12.

During operation, drive controller 26 receives position information indicating a portion of disc 12 to be accessed. Drive controller 26 receives the position information from either an operator, a host computer, or from another suitable controller. Based on the position information, drive controller 26 provides a position signal to actuator 18. The position signal causes actuator 18 to pivot about axis 22. This causes slider 36 to move radially over the surface of disc 12 in a generally arc-like path indicated by arrow 38. Drive controller 26 and actuator 18 operate in a known close loop, negative feed-back manner so that the transducer carried by slider 36 is positioned over the desired portion of disc 12. Once the transducer is appropriately positioned, drive controller 26 then executes a desired read or write operation.

Figure 2:
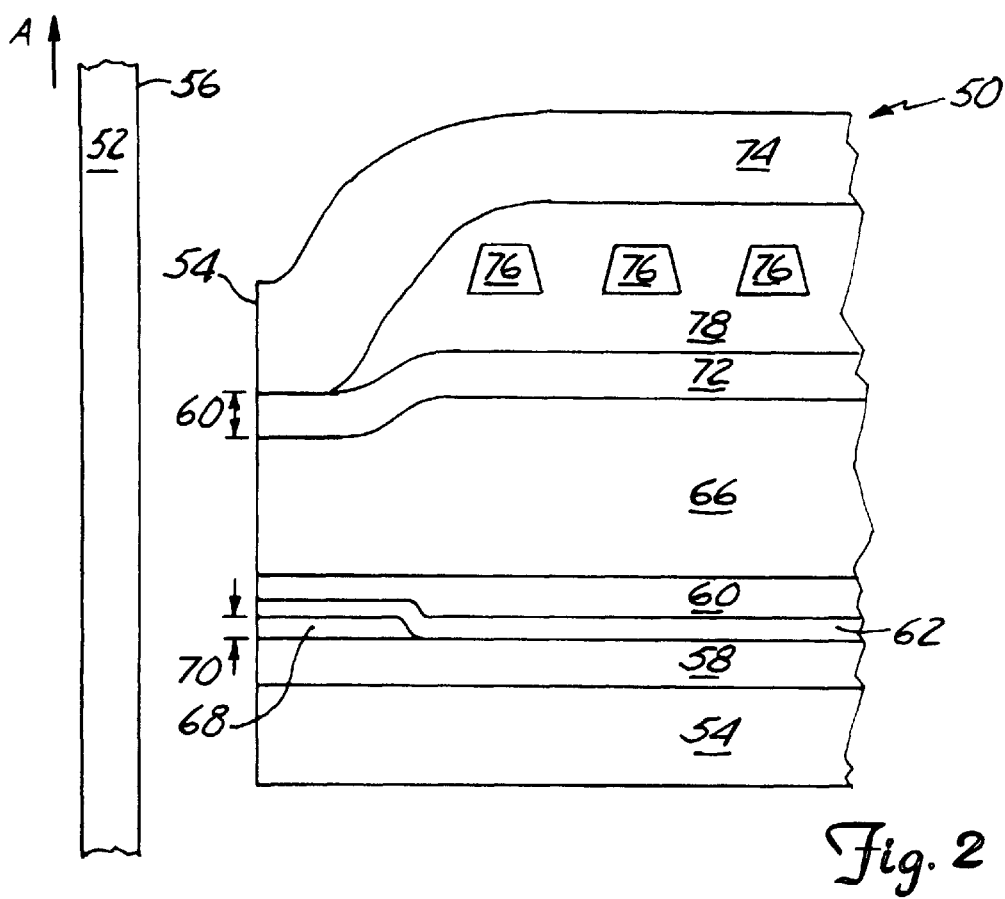
FIG. 2 is a cross-sectional view of a magnetic read/write head and a magnetic disc taken along a plane normal to an air bearing surface of the read/write head.

FIG. 2 is a cross-sectional view of magnetic read/write head 50 and magnetic disc 12 taken along a plane normal to air bearing surface 54 of read/write head 50. FIG. 1 illustrates magnetic read/write head 50 and its placement relative to magnetic disc 12. Air bearing surface 54 of magnetic read/write head 50 faces disc surface 56 of magnetic disc 12. Magnetic disc 12 travels or rotates in a direction relative to magnetic read/write head 10 as indicated by arrow A. The spacing between air bearing surface 54 and disc surface 56 is preferably minimize while avoiding contact between magnetic read head 50 and magnetic disc 12. In most incidences, contact between magnetic read head 50 and magnetic disc 12 would destroy both magnetic read head 50 and magnetic disc 12.

A reader portion of read/write head 50 includes bottom gap layer 58, top gap layer 60, metal contact layer 62, bottom shield 64, top shield 66, and read element 68. Read gap 70 is defined on air bearing surface 54 between bottom gap layer 58 and metal contact layer 62. Metal contact layer 62 is positioned between bottom gap layer 58 and top gap layer 60. Read element 68 is positioned between terminating ends of bottom gap layer 58 and metal contact layer 62.

A writer portion of magnetic read/write head 50 includes top shield 66, write gap layer 72, top pole 74, conductive coil 76, and polymer layer 78. Write gap 80 is defined on air bearing surface 54 by write gap layer 72 between terminating ends of top pole 74 and top shield 66. In addition to acting as a shield, top shield 66 also function as a shared pole for use in conjunction with top pole 74. Electrically conductive coils 76 are provided to generate magnetic fields across write gap 80 and are positioned in polymer layer 78 between top pole 74 and write gap layer 72. While FIG. 2 shows a single layer of conductive coils 76, it is understood in the art that several layers of conductive coils may be used separated by several polymer layers.

Figure 3:
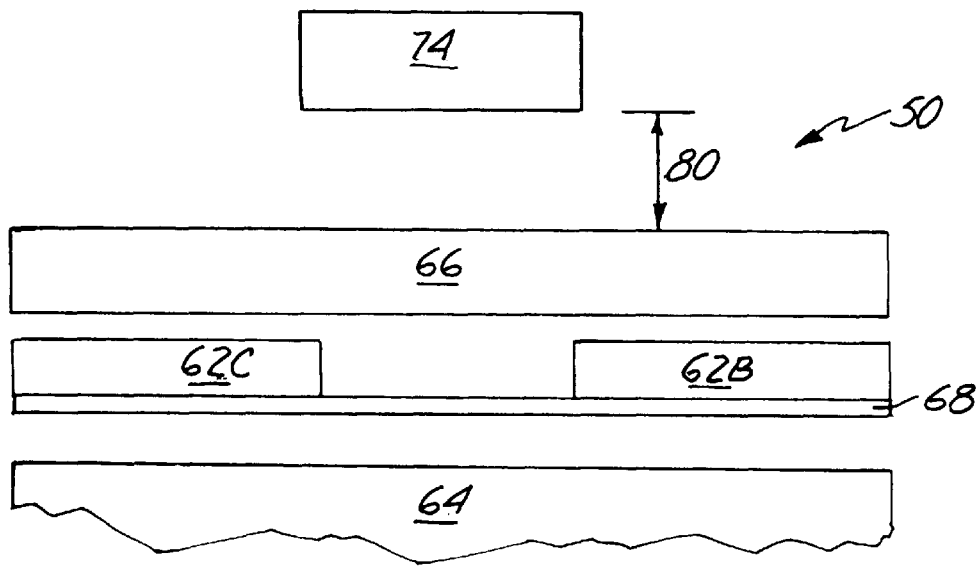
FIG. 3 is a layered diagram of a magnetic read/write head.

FIG. 3 is a layered diagram of magnetic read/write head 50. FIG. 3 illustrates the location of a plurality of magnetically significant elements of magnetic read/write head 50 as they appear along air bearing surface 54 of magnetic read/write head 50 shown in FIG. 2. In FIG. 3, all spacing and insulating layers are omitted for clarity. Bottom shield 64 and top shield 66 are spaced to provide for a location of read element 68. Read element 68 has two passive regions defined as the portions of read element 68 positioned adjacent to metal contacts 62A and 62B. An active region of read element 68 is defined as the portion of read element 68 located between the two passive regions of read element 68. The active region of read element 68 defines a read sensor width.

Read element 68 is preferably a magnetoresistive element or a giant magnetoresistive stack. A magnetoresistive element is generally formed of a ferromagnetic material whose resistance fluctuates in response to an external magnetic field, preferably from a magnetic medium or disc. By providing a sense current through the magnetoresistive element, a change in resistance of the magnetoresistive element can be measured and used by external circuitry to decipher the information stored on the magnetic medium or disc. A giant magnetoresistive stack operates similarly, but allows for a more pronounced magnetoresistive effect. A giant magnetoresistive stack is generally formed of three layers: a ferromagnetic free layer, a ferromagnetic pin layer, and a non-magnetic spacer layer positioned between the free layer and the pin layer. A pinned magnetization of the pin layer is held constant while a free magnetization of the free layer is free to rotate in response to an external magnetic field, i.e. a transition from a magnetic disc. A resistivity of the giant magnetoresistive stack varies as a function of an angle between the direction of the free magnetization and the pin magnetization.

Figure 4:
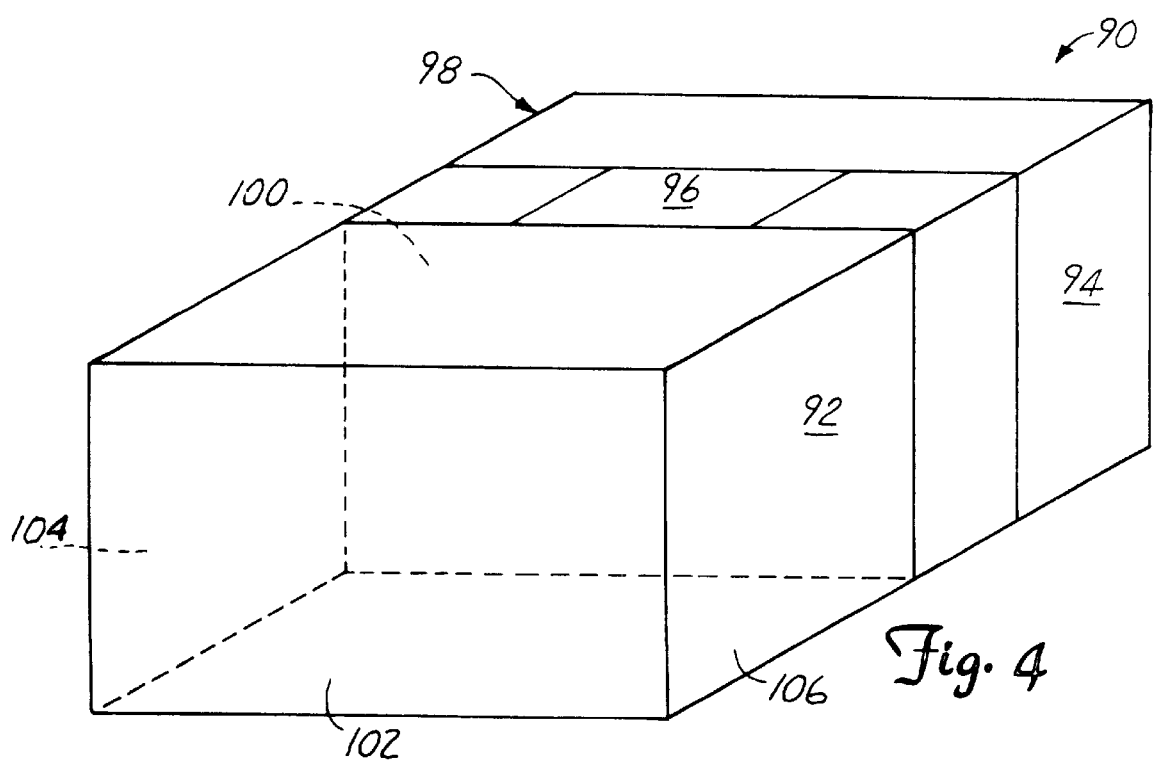
FIG. 4 is a partial perspective view of a magnetic read/write head that includes a bottom shield, a magnetic read element, and a top shield.

FIG. 4 is partial perspective view of magnetic read head 90 that generally includes bottom shield 92, top shield 94, and read element 96 positioned between bottom shield 92 and top shield 94. Magnetic read head 90 has air bearing surface 98.

Bottom and top shields 94 and 98 have, in prior art applications, been formed in several different shapes such as circular, square, rectangular, trapezoidal, or any combination thereof As shown in FIG. 4, bottom shield 92 has a rectangular shape with first surface 100, shown in phantom, approximate read element 96 and second surface 102 opposite first surface 100. Third surface 104, shown in phantom, is opposite fourth surface 106 such that third surface 104 and fourth surface 106 connect first surface 100 to second surface 102. For ease of explanation, magnetic read head 90 and its components, the thicknesses of bottom shield of 92, top shield 94 and read element 96, shown in FIG. 4, are exaggerated. Top shield 98 has a similar shape as bottom shield 94. The phantom lines of top shield 98 have not been shown for clarity.

It has been found that external magnetic fields such as those applied to a magnetic shield, either top or bottom shield, of a read element during manufacture and use, tend to randomized the magnetic domain pattern of the magnetic shield. For example, when magnetic fields of sufficient magnitude are applied to the magnetic shield in its easy axis direction, the magnetic shield can saturate in the easy axis direction. When the external field is reduced to zero, a rectangular shield geometry of the type used in the prior art develops a random, unpredictable and undesired domain structure which interferes with operation of the read element. After manufacture, the read element may also be intentionally subjected to large easy axis magnetic fields during a procedure in which the read element is "set" into a single domain state. Additionally, during assembly of a disk drive, a read element (and consequently the magnetic shield associated with the read element) may be subjected to randomly oriented magnetic fields of about 10 Oersteds to about 100 Oersteds, which may further act to destabilize the magnetic shield.

Figure 5:
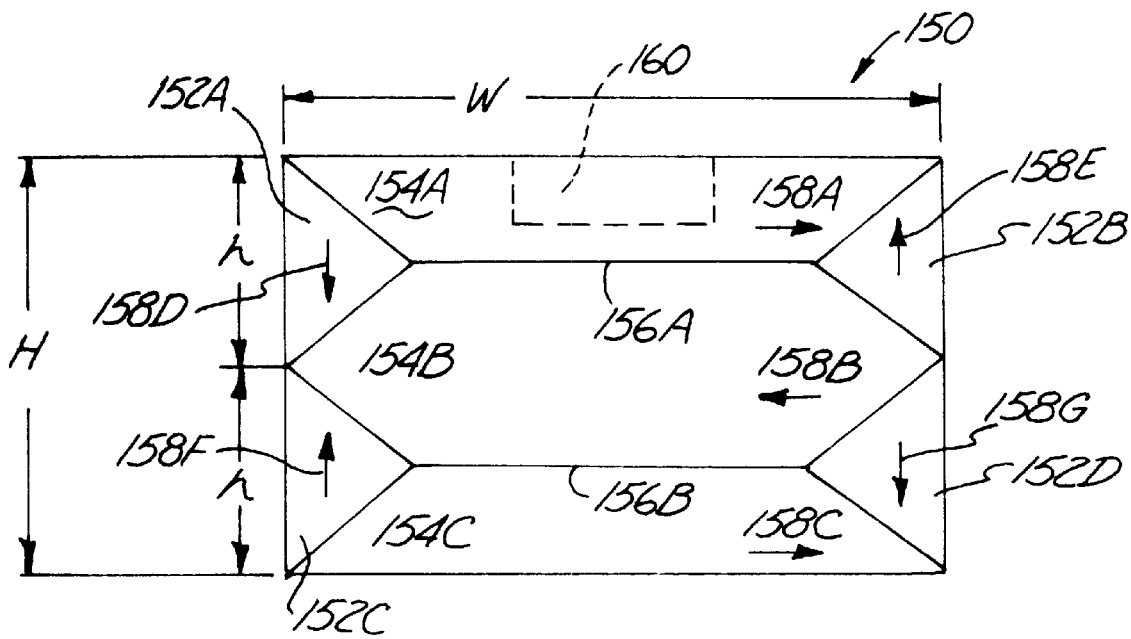
FIG. 5 is a cross-sectional view of a bottom shield of the present invention operating under no external magnetic fields.

FIG. 5 is a cross-sectional view of shield 150 of the present invention operating under no external magnetic fields. Shield 150 includes triangular shaped closure magnetic domains 152A, 152B, 152C, and 152D, magnetic domains 154A, 154B, 154C, and magnetic domain walls 156A and 156B. Magnetizations 158A–158G represent the magnetization on each magnetic domain. Shield 150 has been designed such that the width W to height H ratio provides an ideal magnetic domain structure. The width to height ratio is dependent upon various material characteristics including anisotropy, magnetic moment, and film thickness. For any material the ideal height should equal the height of two domain periods for any feature width. This can be determined by calculation or by empirical study of domains on rectangular features of varying width and height. This width to height ratio permits exactly two triangular shaped closure magnetic domains to be positioned on each side of shield 150. Thus triangular shaped closure magnetic domains 152A–152D each equal an equilibrium domain, the equilibrium domain being an average width of a magnetic domain in a demagnetized sample shield that has a total magnetic moment equal to zero.

With no magnetic field being exerted on shield 150, triangular shaped closure magnetic domains 152A–152D each have a base height h equal to one-half of shield height H. In addition, magnetic domain 154A has a height equal to that of magnetic domain 154C. Likewise, due to the specific design, the height of magnetic domain 154B is equal to twice that of the height of either magnetic domain 154A or magnetic domain 154C. As shown in FIG. 5, shield 150 is sized with a width larger than the width of read element 160. This design feature facilitates that no domain walls pass through a portion of read element 160.

Figure 6:
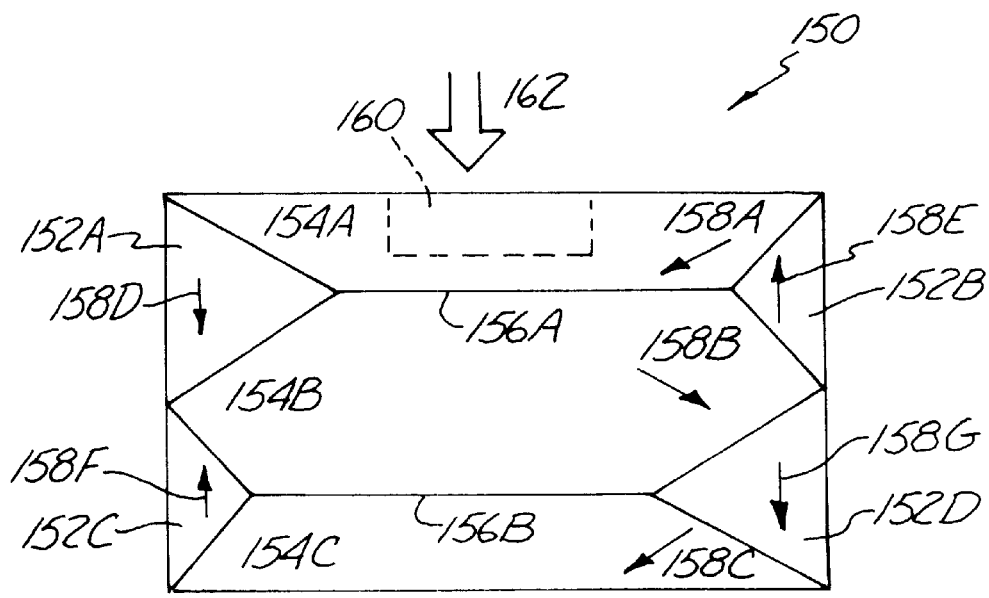
FIG. 6 is a cross-sectional view of the bottom shield of the present invention operating under an external magnetic field from a magnetic media.

FIG. 6 is cross-sectional view of shield 150 of the present invention operating under an external magnetic field from a magnetic media. The magnetic field is represented by arrow 162. External field 162 causes magnetizations 158A–158C to rotate in a direction toward the direction of external field 162. As shown in FIG. 6, external field 162 is operating in an upward direction. Thus, magnetization 158A–158C are rotating in an upward direction. However, it can be seen in FIG. 6 that magnetization 158D–158G, which correspond to triangular shaped closure magnetic domains 152A–152D, respectively, are not rotating in the presence of external field 162. Magnetizations 158D–158G do not rotate since these magnetizations are initially positioned parallel to external field 162. With this parallel scheme, magnetizations 158D–158G do not rotate. However, the shape of triangular shaped closure magnetic domains 152A–152D do change in that the angle of triangular shaped magnetic domains 152A and 152D which domain walls 156A and 156B intersect become more acute, while the angle of triangular shaped magnetic domains 152B and 152C intersect become more obtuse. Consequently, the position of magnetic domain walls 156A and 156B do not move in a direction towards read element 160, as in the prior art, since a property of each magnetic domain wall is that the domain wall is constantly attempting to settle at the lowest possible energy state. The lowest possible energy state in this case corresponds with the shortest possible length of a magnetic domain wall. Therefore, magnetic domain walls 156A and 156B will stay at a low and constant energy state positioned between intersecting points of triangular shaped closure magnetic domains 152A–152D.

It is a noteworth design feature of the present invention that the width W of shield 150 is greater than the width of read element 160. In one preferred embodiment, the width W of shield 150 is at least five times wider than the width of read element 160. As in FIG. 6, even in the presence of external field 162, none of the domain walls of the present bottom shield intersect read element 160. Thus, no local perturbation is caused in read element 160 resulting in Barkhausen noise. Therefore, read element 160 can properly read information from magnetic disc 12 (shown in FIG. 1).

The present invention achieves a single magnetic domain state adjacent to a magnetoresistive read element of a magnetic recording head, and thereby achieves repeatable stable read back of information from a magnetic media. The present invention restricts the area of motion of shield domain walls to prevent their interaction with the read element. This is achieved by means of a shield dimension design utilizing demagnetization fields to pin the shield domain walls away from the read element. The present invention discloses two easy axis domain walls 156A and 156B since the total motion of domain wall 156A adjacent to read element 160 is less than if a single easy axis domain wall was used. In addition, two easy axis walls are preferred to a larger number of domain walls since a higher number of domain walls may not result in keeping the adjacent domain wall away from the read element, depending on the dimensions of a bottom shield.

Although the present invention has been described with reference to preferred embodiments, workers skilled in the art will recognize that changes may be made in form and detail without departing from the spirit and scope of the invention.

What is claimed is:

1. A reader apparatus of a magnetic read/write head, the reader apparatus comprising:

a read element; and shield means for ensuring that the read element reads only information stored directly beneath it on a specific track of a magnetic medium, the shield means being positioned adjacent the read element and having a height substantially equal to a whole number multiple of an equilibrium domain period to restrict a location of a domain wall within the shield means such that the domain wall does not interact with the read element, wherein the equilibrium domain period is an average height of a magnetic domain in a demagnetized sample shield effectively having a total magnetic moment of zero.

2. A magnetic read/write head comprising:

a read element extending a read element height into the head from an air bearing surface of the head and spanning a read element width across a plane substantially normal to the air bearing surface of the head;

a shield extending a shield height substantially greater than the read element height into the head from the air bearing surface of the head and spanning a shield width substantially greater than the read element width across a plane normal to the air bearing surface of the head, the shield height and the shield width each being selected to ensure that none of a plurality of domain walls within the shield interact with the read element, wherein the shield height is selected as a whole number multiple of an equilibrium domain period, the equilibrium domain period being an average height of a magnetic domain in a demagnetized sample shield that has a total magnetic moment substantially equal to zero.

3. The magnetic read/write head of claim 2 wherein the whole number multiple is two.

4. The magnetic read/write head of claim 2 wherein the shield width is at least five times greater than the read element width.

5. The magnetic read/write head of claim 2 wherein the shield: is formed from a ferromagnetic layer having an easy axis parallel to the air bearing surface of the head.

6. The magnetic read/write head of claim 16 wherein the shield has opposing first and second edges each substantially normal to the air bearing surface of the head, and wherein the selection of the shield height and the shield width to ensure that none of a plurality of domain walls within the shield interacts with the read element results in an equilibrium magnetic domain configuration of the shield comprising:

a first magnetic domain positioned adjacent the air bearing surface;

a second magnetic domain positioned adjacent the first domain, the second domain being separated from the first domain by a first magnetic domain wall;

a third magnetic domain positioned adjacent the second domain such that the second domain is positioned between the first and third domains, the third domain being separated from the second domain by a second magnetic domain wall;

a first triangularly-shaped closure domain positioned adjacent the first edge and approximate the air bearing surface, the first closure domain being adjacent each of the first and second domains;

a second triangularly-shaped closure domain positioned adjacent the second edge and approximate the air bearing surface, the second closure domain being adjacent each of the first and second magnetic domains;

a third triangularly-shaped closure domain positioned adjacent the first edge and opposite the air bearing surface, the third closure domain being adjacent each of the second and third domains; and a fourth triangularly-shaped closure domain positioned adjacent the second edge and opposite the air bearing surface, the fourth closure domain being adjacent each of the second and third domains.

7. The magnetic read/write head of claim 6 wherein each of the first and second magnetic domain walls is substantially parallel to the air bearing surface of the head.

* * * * *

UNITED STATES PATENT AND TRADEMARK OFFICE
CERTIFICATE OF CORRECTION

PATENT NO.  : 6,222,702 B1
DATED       : April 24, 2001
INVENTOR(S) : Declan Macken et al.

It is certified that error appears in the above-identified patent and that said Letters Patent is hereby corrected as shown below:

Column 1,
Line 62, delete "elites", insert -- eliminates --

Column 3,
Line 31, delete "minimize", insert -- minimized --

Column 7,
Line 2, delete "shield:", insert -- shield --
Line 9, delete "16", insert -- 2 --

Signed and Sealed this

Twelfth Day of March, 2002

Attest:

Attesting Officer

JAMES E. ROGAN
Director of the United States Patent and Trademark Office